(No Model.)
F. NITSCHMANN.
PLOW.
No. 381,946. Patented May 1, 1888.
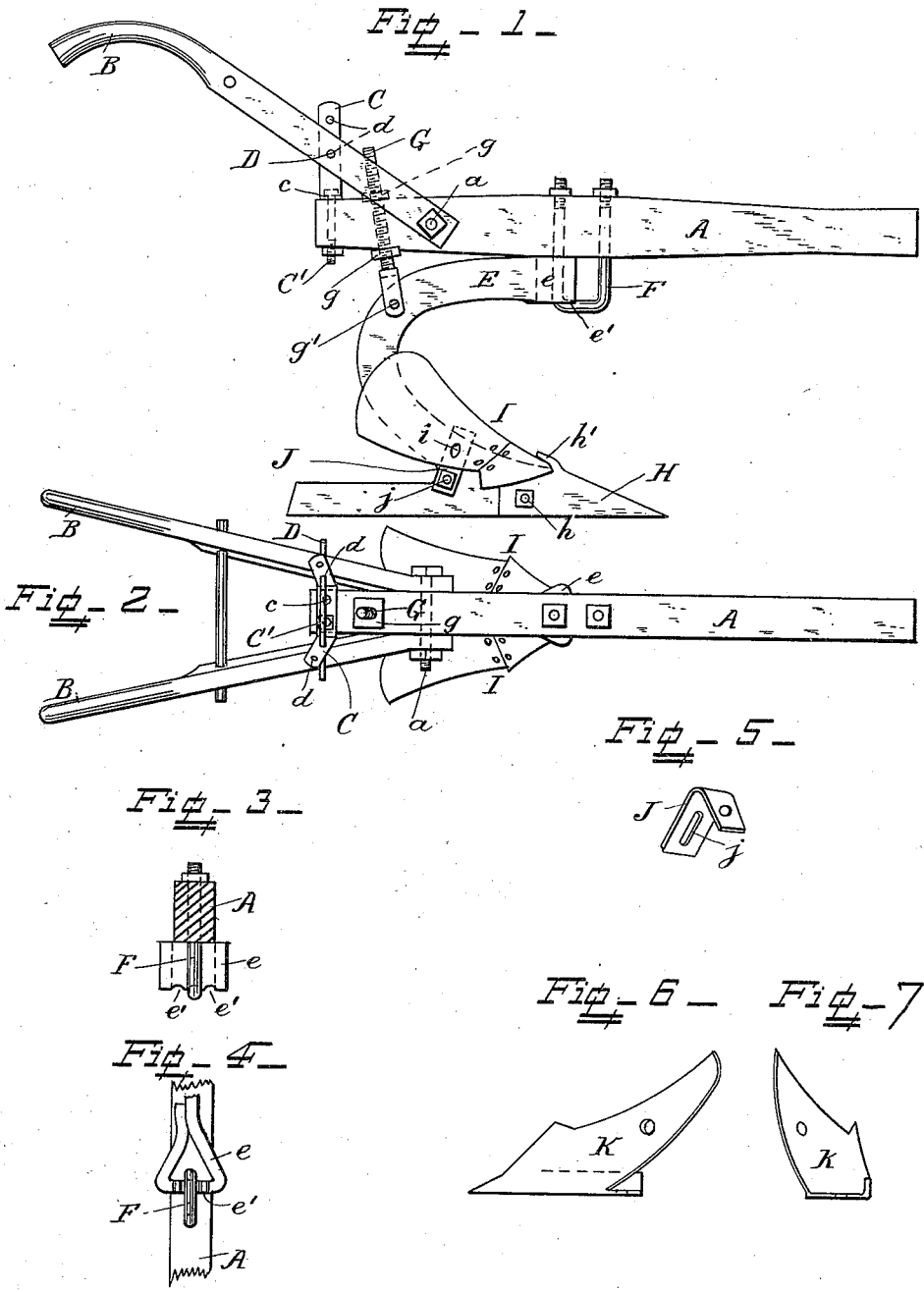
Witnesses.
W. L. Porter.
W. S. Boyd.
Inventor.
F. Nitschmann.
By his Attorney
Herbert W. T. Jenner.

UNITED STATES PATENT OFFICE.

FRANZ NITSCHMANN, OF FLATONIA, TEXAS.

PLOW.

SPECIFICATION forming part of Letters Patent No. 381,946, dated May 1, 1888.

Application filed February 11, 1888. Serial No. 263,727. (No model.)

*To all whom it may concern:*

Be it known that I, FRANZ NITSCHMANN, a citizen of the United States, residing at Flatonia, in the county of Fayette and State of Texas, have invented certain new and useful Improvements in Plows; and I do hereby declare the following to be a full, clear, and exact description of the invention, such as will enable others skilled in the art to which it appertains to make and use the same.

This invention relates to plows; and it consists in the novel construction and combination of the parts, as hereinafter fully described and claimed, whereby the plow can be used as a combination implement for turning or dividing the soil, and whereby every portion of it is made adjustable.

In the drawings, Figure 1 is a side view of the plow with the blades attached. Fig. 2 is a plan view of the same from above. Fig. 3 is a detail front end view of the top portion of the shank, showing its attachment to the plow-beam. Fig. 4 is a plan view of the same from below. Fig. 5 is a perspective view of one of the brackets which secure the blades to the shank. Fig. 6 is a side and Fig. 7 is a rear end view of a turning attachment to be used instead of the blades.

A is the plow-beam, and B are the handles, pivoted to the beam by the pin $a$. To admit of both vertical and lateral adjustment, the handles are secured to the beam by the bracket C, provided with holes $c$ and $d$.

C' is a bolt which passes through either of the holes $c$ to secure the bracket to the plow-beam, and D is a pin which passes through either of the holes $d$ in said bracket and through the plow-handles.

E is the shank, having the triangular loop $e$ at its top end, which loop is provided with the notches $e'$ upon its bottom edge.

F is a staple which passes through the plow-beam and the loop $e$ and engages with either of the notches $e'$, according to the lateral adjustment required for the shank. The rear portion of the shank is pivotally connected to the beam by the screw-threaded bolt G, which also affords a means for adjusting it vertically.

$g$ are the adjusting-nuts upon bolt G, and $g'$ is a pin which passes through a double eye at the end of the bolt and connects it to the shank.

H is the separable point, which is secured to the shank by the bolt $h$, and $h'$ is a projection upon the upper side of the point for protecting the points of the blades I, which engage with it. Each blade I has a bracket, J, secured to it by the bolt $i$, and each bracket has an elongated hole, $j$, through which the bolt $j'$ passes and secures the blades to the shank after they have been set to the desired angle, as permitted by the elongation of holes $j$.

K is a turning implement, which may be secured to the shank in place of the blades I and the point, the inclination of the handles and the adjustment of the connection of the shank with the plow-beam being varied, as before described, to enable the implement to be used as a turning-plow to the best advantage.

What I claim is—

1. In a plow, the combination, with the plow-beam, of the staple F, secured to the plow-beam, the curved shank E, provided at its upper front end with the triangular loop $e$, having notches $e'$ on its lower edge, which engage with the said staple, the bolt G, pivoted in the said plow-beam and connected to the rear portion of the shank under the handles, and the blades secured to the lower front end of shank under the staple, substantially as and for the purpose set forth.

2. In a plow, the combination, with the plow-beam, of the staple F, secured to the plow-beam, the curved shank E, provided at its upper front end with the triangular loop $e$, having notches $e'$ on its lower edge, which engage with the said staple, the screw-threaded bolt G, pivoted in the said plow-beam and provided with the adjusting-nuts $g$, the pin $g'$, pivoting the lower end of said bolt to the rear portion of the shank under the handles, and the blades secured to the lower front end of the shank under the staple, substantially as and for the purpose set forth.

In testimony whereof I affix my signature in presence of two witnesses.

FRANZ NITSCHMANN.

Witnesses:
C. STOFFERS,
ROBERT HEEDLES.